(12) United States Patent
Huang et al.

(10) Patent No.: US 11,211,212 B2
(45) Date of Patent: Dec. 28, 2021

(54) KEYBOARD AND ELECTRONIC DEVICE (71) Applicant: Huawei Technologies Co., Ltd., Guangdong (CN)

(72) Inventors: Weiyong Huang, Taiwan (CN); Yaming Jiang, Wuhan (CN); Lei Bai, Wuhan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 15/733,784

(22) PCT Filed: Apr. 28, 2018

(86) PCT No.: PCT/CN2018/085181
§ 371 (c)(1),
(2) Date: Oct. 26, 2020

(87) PCT Pub. No.: WO2019/205168
PCT Pub. Date: Oct. 31, 2019

(65) Prior Publication Data
US 2021/0249204 A1  Aug. 12, 2021

(51) Int. Cl.
*H01H 13/7065* (2006.01)
*G06F 3/02* (2006.01)
*H01H 13/83* (2006.01)

(52) U.S. Cl.
CPC ....... *H01H 13/7065* (2013.01); *G06F 3/0202* (2013.01); *H01H 13/83* (2013.01); *H01H 2219/04* (2013.01)

(58) Field of Classification Search
CPC ...... H01H 3/125; H01H 13/705; H01H 13/14; H01H 13/70; H01H 13/704; H01H 13/7065; H01H 13/7006; H01H 13/7057; H01H 13/78; H01H 13/79; H01H 13/52; H01H 13/703; H01H 13/507; G06F 3/016; G06F 3/0202; G06F 3/04886; G06F 3/044; G06F 3/017; G06F 3/0416; G06F 3/0488; G06F 1/1662; G06F 3/03547

See application file for complete search history.

(56) References Cited

U.S. PATENT DOCUMENTS

| | | | | |
|---|---|---|---|---|
| 9,997,309 | B2 * | 6/2018 | Yao | H01H 13/705 |
| 2011/0000775 | A1 * | 1/2011 | Itou | H01H 13/705 |
| | | | | 200/520 |
| 2014/0340317 | A1 * | 11/2014 | Rodzeveski | G06F 3/048 |
| | | | | 345/173 |
| 2018/0158625 | A1 * | 6/2018 | Mahajan | H01H 13/79 |

* cited by examiner

*Primary Examiner* — Ahmed M Saeed
(74) *Attorney, Agent, or Firm* — Womble Bond Dickinson (US) LLP (57) ABSTRACT

A keyboard includes a bottom plate, a circuit board disposed on the bottom plate, and a plurality of keys disposed on a side that is of the circuit board and that is away from the bottom plate. Each key includes a keycap, a rise-and-fall component connecting the keycap to the bottom plate, and an electronic ink screen fastened on a side that is of the keycap and that is away from the rise-and-fall component. A first electric conductor connected to the electronic ink screen is disposed on the keycap, a second electric conductor is disposed on the rise-and-fall component, and a third electric conductor is disposed on the bottom plate. A signal line used to supply power to the electronic ink screen is disposed on the circuit board.

20 Claims, 7 Drawing Sheets

KEYBOARD AND ELECTRONIC DEVICE

CROSS-REFERENCE TO RELATED APPLICATIONS

This application is a national stage of International Application No. PCT/CN2018/085181, filed on Apr. 28, 2018, the disclosure of which is incorporated herein by reference in its entirety.

TECHNICAL FIELD

This application relates to the field of input device technologies, and in particular, to a keyboard and an electronic device.

BACKGROUND

A backlit keyboard is a keyboard whose key has a light emitting function, and can be used by a user in a relatively dark environment. Currently, a structure of an existing backlit keyboard includes a bottom plate, a thin-film switch circuit disposed on the bottom plate, a plurality of keys disposed on the thin-film switch circuit, and a backlight source component disposed below the bottom plate. A light transmission hole is disposed at a position that corresponds to each key and that is on the bottom plate, and each key includes a keycap and a rise-and-fall component connecting the keycap to the thin-film switch circuit. The keycap and the thin-film switch circuit are usually made of a light-transparent material. For the keycap, light shielding paint needs to be sprayed on a surface of the keycap, and then a laser engraving process is performed to form a corresponding light-transparent character. In this way, light emitted by the backlight source component sequentially passes through the light transmission hole in the bottom plate, the thin-film switch circuit, and the rise-and-fall component, and illuminates the keycap, so that the light shines through the character on the keycap, generating a light emitting effect. A disadvantage of the backlit keyboard is that the light emitted by the backlight source component needs to pass through an internal structure of the keyboard to illuminate the keycap. A blocking effect of a component such as the rise-and-fall component likely results in uneven luminance of the character on the keycap.

Another manner used for the key to emit light is to dispose an electronic ink screen on the key, and a power supply signal for the electronic ink screen needs to be provided by a circuit board. To transmit the power supply signal from the circuit board to the electronic ink screen, in an existing implementation, a signal transmission line is disposed in an elastic part located between the keycap and the thin-film switch circuit. One end of the line in the elastic part is electrically connected to the electronic ink screen through a signal transmission hole in the keycap, and the other end is electrically connected to the thin-film switch circuit. A biggest disadvantage of this manner is that an insecure structure of the elastic part is ignored. Once the elastic part moves slightly between the keycap and the circuit board, the line is blocked, and the power supply signal cannot be transmitted to the electronic ink screen, resulting in relatively low use reliability of the keyboard.

SUMMARY

This application provides a keyboard and an electronic device, to resolve a problem that a light emitting effect of a key is poor.

According to a first aspect, this application provides a keyboard. The keyboard includes a bottom plate, a circuit board, and a plurality of keys. The circuit board is disposed on the bottom plate, and the key is disposed on a side that is of the circuit board and that is away from the bottom plate. The key includes a keycap and a rise-and-fall component connecting the keycap to the bottom plate. The rise-and-fall component may be used to implement reciprocating motion of the keycap between a first position at which the keycap is not pressed and a second position at which the keycap is pressed. In addition, the key is configured as a key having a light emitting function. A specific implementation is that an electronic ink screen is disposed on a side that is of the key and that is away from the rise-and-fall component, and the circuit board may supply power to the electronic ink screen. To implement an electric connection between the electronic ink screen and the circuit board, a conductive path may be disposed on each of the keycap, the rise-and-fall component, and the bottom plate whose positions are relatively fixed. To be specific, a first electric conductor is disposed on the keycap, a second electric conductor is disposed on the rise-and-fall component, and a third electric conductor is disposed on the bottom plate. During specific disposing, the first electric conductor is electrically connected to the electronic ink screen. One end of the second electric conductor is electrically connected to the first electric conductor at a joint between the keycap and the rise-and-fall component, and the other end of the second electric conductor is electrically connected to the third electric conductor at a joint between the rise-and-fall component and the bottom plate. The third electric conductor is electrically connected to a signal line that is disposed on the circuit board and that is used to supply power to the electronic ink screen. In this way, a power supply signal provided by the signal line on the circuit board may be transmitted to the electronic ink screen through the third electric conductor, the second electric conductor, and the first electric conductor in sequence.

In the foregoing embodiment, after receiving the power supply signal provided by the circuit board, the electronic ink screen may display corresponding word or pattern content, to implement the light emitting function of the key. Compared with the prior art in which luminance of the key is uneven because of backlight provided by a backlight source component, this solution can effectively improve a light emitting effect of the key. In addition, because the positions of the keycap, the rise-and-fall component, and the bottom plate are fixed, the power supply signal from the circuit board is transmitted to the electronic ink screen through the electric conductors disposed on the bottom plate, the rise-and-fall component, and the keycap in sequence. This can further improve transmission reliability of the power supply signal. In other words, this improves use reliability of the keyboard.

To enable an electronic ink screen of one key to display a plurality of types of content, the electronic ink screen may be disposed to perform partition-based display. The electronic ink screen includes at least one display area. The keycap has the first electric conductor that is one-to-one connected to each display area, the rise-and-fall component has the second electric conductor that is in a one-to-one electric connection to each first electric conductor, and the bottom plate has the third electric conductor that is in a one-to-one electric connection to each second electric conductor. The circuit board has the signal line used to supply power to each display area, and each signal line is electrically connected to a corresponding third electric conductor. During specific disposing, the electronic ink screen includes four display areas, so that an electronic ink screen of each key displays four different types of content, and user experience is relatively good.

Each electric conductor is disposed in different manners based on different specific structures of the rise-and-fall component. The following separately describes specific disposing manners of each electric conductor by using the following several structures of the rise-and-fall component as examples.

In an embodiment, the rise-and-fall component includes a bracket that presses against the bottom plate, a support cradle fastened to the keycap, and the first electric conductor. A sliding slot whose opening faces the keycap is disposed in the support cradle, the support cradle is slidingly assembled in the sliding slot, and a first elastic part is also disposed in the sliding slot. One end of the first elastic part presses against the circuit board, and the other end of the first elastic part presses against the support cradle. In addition, to implement contact between the bracket and the bottom plate, a first avoidance hole is disposed at a corresponding position of the circuit board.

The first electric conductor is a first via disposed in the keycap. The second electric conductor includes a first metal layer disposed on an inner wall of the sliding slot and a second metal layer that is disposed on an outer wall of the support cradle and that is electrically connected to the first metal layer. An end that is of the first metal layer and that is close to the bottom plate is electrically connected to the third electric conductor, and an end that is of the second metal layer and that is close to the keycap is electrically connected to the first via.

In this solution, the second electric conductor is disposed on a surface of the support cradle and on a surface of the sliding slot that move in an opposite direction. Even if the support cradle slides in the sliding slot of the bracket, it may also be ensured that the first metal layer can be reliably connected to the second metal layer.

The first elastic part is used to provide elastic support force required when the keycap is maintained at the first position at which the keycap is not pressed, and also needs to meet an easiness requirement when a user is pressing the key. During specific disposing, the first elastic part is made of a rubber material, and the first elastic part is a circular truncated cone having a hollow structure.

To prevent the support cradle from sliding out of the sliding slot and improve structural reliability of the rise-and-fall component, a guide rail is disposed in the inner wall of the sliding slot in a moving direction of the keycap. There is a position-limiting part at an end that is of the guide rail and that is away from the bottom plate. There is a position-limiting step at an end that is of the outer wall of the support cradle and that is away from the keycap, and the position-limiting step is slidingly assembled in the guide rail and may be limited to be located in the position-limiting part.

In another embodiment, the rise-and-fall component includes a first frame and a second frame that are disposed in a cross manner, and a second elastic part. One end of the second elastic part presses against the circuit board, and the other end of the second elastic part presses against the keycap. For the first frame, a first end is articulated to the bottom plate through a second avoidance hole disposed in the circuit board, and a second end is slidingly connected to the keycap. For the second frame, a first end is articulated to the keycap, and a second end is slidingly connected to the bottom plate through a third avoidance hole disposed in the circuit board.

Similarly, the second elastic part is used to provide the elastic support force required when the keycap is maintained at the first position at which the keycap is not pressed, and also needs to meet the easiness requirement when the user is pressing the key. During specific disposing, the second elastic part is made of a rubber material, and the second elastic part is a circular truncated cone having a hollow structure.

When the first frame is connected to the bottom plate and the keycap, the first end of the first frame has a first articulated shaft, the bottom plate has a first articulated hole that is articulated to the first articulated shaft, and the second end of the first frame has a first slider. A first hook whose opening direction is opposite to a side of an articulated joint between the first frame and the second frame is disposed on a side that is of the keycap and that faces the circuit board. The first slider is slidingly assembled in the first hook.

When the second frame is connected to the bottom plate and the keycap, the first end of the second frame has a second articulated shaft, a convex lug provided with a second articulated hole is disposed on the side that is of the keycap and that faces the circuit board. The second articulated shaft is articulated to the second articulated hole, and the second end of the second frame has a second slider. A second hook whose opening direction is opposite to the side of the articulated joint between the first frame and the second frame is disposed on the bottom plate. The second slider is slidingly assembled in the second hook.

For the rise-and-fall component that uses the foregoing structure, the first electric conductor includes a second via disposed in the keycap and a third metal layer disposed on a surface of the first hook. The second via is connected to the electronic ink screen, and the third metal layer is connected to the first via. The second electric conductor includes a fourth conducting layer, and the fourth conducting layer covers an outer wall of the first slider, a surface of the first frame, and an outer wall of the first articulated shaft. The third electric conductor includes a fifth metal layer disposed on an inner wall of the first articulated hole. In this way, a metal layer is disposed on a surface of the first frame and on a surface of the bottom plate that move in an opposite direction, and a metal layer is disposed on a surface of the first frame and on a surface of the keycap that move in an opposite direction. Even if the first frame rotates relative to the bottom plate or moves relative to the keycap, it may also be ensured that the third metal layer is reliably electrically connected to the fourth metal layer, and the fourth metal layer is reliably electrically connected to the fifth metal layer.

And or alternatively, the first electric conductor includes a third via disposed in the keycap and a sixth metal layer that is electrically connected to the third via. The sixth metal layer covers an inner wall of the second articulated hole and a surface of the convex lug, and the third via is connected to the electronic ink screen. The second electric conductor includes a seventh metal layer, and the seventh metal layer covers an outer wall of the second articulated shaft, a surface of the second frame, and an outer wall of the second slider. The third electric conductor includes an eighth metal layer disposed on a surface of the second hook. In this way, a metal layer is disposed on a surface of the second frame and on a surface of the bottom plate that move in an opposite direction, and a metal layer is disposed on a surface of the second frame and on a surface of the keycap that move in an opposite direction. Even if the second frame moves relative to the bottom plate or rotates relative to the keycap, it may also be ensured that the sixth metal layer is reliably electrically connected to the seventh metal layer, and the seventh metal layer is reliably electrically connected to the eighth metal layer.

In another embodiment, the rise-and-fall component includes a metal spring disposed on the circuit board, a back-up cradle that is disposed on the keycap and that is located opposite to the metal spring, a first connection part disposed on the bottom plate, and a second connection part disposed on the keycap.

An end that is of the back-up cradle and that is away from the keycap presses against the metal spring. The first connection part includes a first vertical plate that passes through a fourth avoidance hole disposed in the circuit board and that is disposed facing the keycap, and a strip-shaped hole is disposed in the first vertical plate in a moving direction of the keycap. The second connection part includes a second vertical plate that is disposed facing the bottom plate, and a cylinder that is slidingly assembled in the strip-shaped hole is disposed on the second vertical plate.

For the rise-and-fall component that uses the foregoing structure, the first electric conductor is a fourth via disposed in the keycap. The second electric conductor includes a ninth metal layer and a tenth metal layer that is electrically connected to the third electric conductor. The ninth metal layer covers an outer wall of the cylinder and a surface of a second vertical wall, and the tenth metal layer covers an inner wall of the strip-shaped hole and a surface of the first vertical plate. In this way, a metal layer is disposed on a surface of the strip-shaped hole of the first connection part and on a surface of the cylinder of the second connection part that move in an opposite direction. Even if the cylinder slides in the strip-shaped hole, it may also be ensured that the ninth metal layer is reliably connected to the tenth metal layer.

When the electronic ink screen is fastened to the keycap, an accommodating groove may be disposed on a surface of a side that is of the keycap and that is away from the rise-and-fall component, so that the electronic ink screen can be accommodated in the accommodating groove. In addition, to reduce a risk of damaging the electronic ink screen, each key further includes a transparent cover configured to seal the electronic ink screen in the accommodating groove, and the transparent cover is detachably connected to the keycap.

According to a second aspect, this application further provides an electronic device, and the electronic device includes any one of the foregoing keyboards. A key on the keyboard of the electronic device has a relatively good light emitting effect.

DESCRIPTION OF EMBODIMENTS

To make the objectives, technical solutions, and advantages of the present application clearer, the following further describes the present application in detail with reference to the accompanying drawings. Certainly, the described embodiments are merely some rather than all of the embodiments of the present application. All other embodiments obtained by a person of ordinary skill in the art based on the embodiments of the present application without creative efforts shall fall within the protection scope of the present application.

Figure 1:
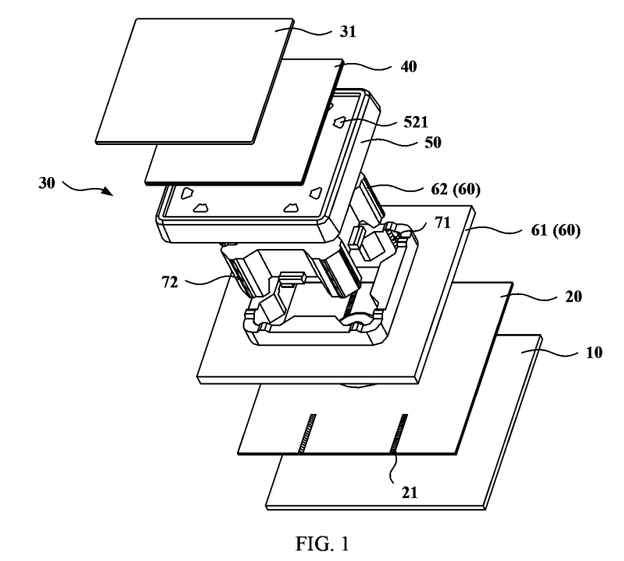
FIG. 1 is a schematic structural diagram of a key according to an embodiment of this application.

A keyboard in the embodiments of this application is applied to an electronic device. The electronic device may be a common terminal in the prior art, such as a desktop computer or a laptop computer, and may be configured to externally connect to a wired keyboard or a wireless keyboard. Alternatively, the electronic device may be a device such as a mobile phone connected to a keyboard. First, referring to FIG. 1, FIG. 1 shows a keyboard according to an embodiment of this application. The keyboard includes a bottom plate 10, a circuit board 20, and a plurality of keys 30. For ease of description, in FIG. 1, one key is used as an example for description. The circuit board 20 is disposed on the bottom plate 10, and the key 30 is disposed on a side that is of the circuit board 20 and that is away from the bottom plate 10. For each key 30, a structure of the key 30 includes a keycap 50 and a rise-and-fall component 60 connecting the keycap 50 to the bottom plate 10. The keycap 50 usually has two working positions: a first position at which the keycap 50 is not pressed and a second position at which the keycap 50 is pressed. The rise-and-fall component 60 may be used to implement reciprocating motion of the keycap 50 between the first position and the second position. The rise-and-fall component 60 provides driving force for the keycap 50 to move from the second position to the first position. In addition, the rise-and-fall component 60 further provides support force for the keycap 50 at the first position.

Figure 2:
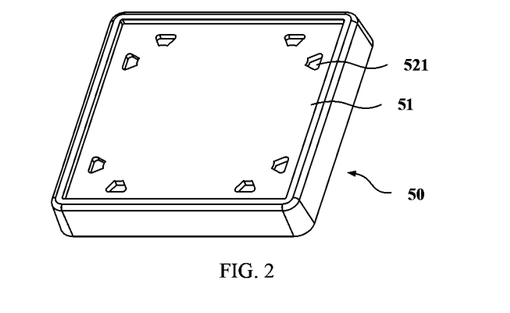
FIG. 2 is a schematic structural diagram of a keycap according to an embodiment of this application.

For a problem in the prior art that a light emitting effect of a key of a backlit keyboard is poor, the key 30 in this embodiment of this application further includes a display screen, for example, an electronic ink screen 40. With reference to FIG. 1 and FIG. 2, an accommodating groove 51 is disposed on a surface of a side that is of the keycap 50 and that is away from the rise-and-fall component 60, and the electronic ink screen 40 is located in the accommodating groove 51. It may be understood that a manner of fastening the electronic ink screen 40 to the keycap 50 is not limited to the foregoing manner. For example, the electronic ink screen 40 may be directly fastened on the surface of the side that is of the keycap 50 and that is away from the rise-andfall component. In this way, a signal line 21 that is on the circuit board 20 and that provides a power supply signal is transmitted to the electronic ink screen 40, so that the electronic ink screen 40 may display corresponding content. In addition, to enable the key 30 to display different content, in this embodiment of this application, the electronic ink screen 40 has at least one display area. In this case, the circuit board 20 includes signal lines 21 that are in a one-to-one correspondence with display areas, and each signal line 21 is electrically connected to a corresponding display area. In this way, a user may select, based on a use requirement, content displayed on the electronic ink screen 40 on each key 30. This greatly improves user experience. In addition, the key 30 further includes a transparent cover 31 that is detachably connected to the keycap 50. Closed space for accommodating the electronic ink screen 40 is formed between the transparent cover 31 and the accommodating groove 51 of the keycap 50, and the electronic ink screen 40 is disposed in the closed space. This can greatly reduce a risk of damaging the electronic ink screen 40 because of abrasion and scraping.

The circuit board in this embodiment of this application may be a printed circuit board, a flexible circuit board, or a thin-film circuit board. When the circuit board is the thin-film circuit board, the circuit board includes the signal line that provides the power supply signal for the electronic ink screen, and may further implement input of a key signal. Specifically, there is a key switch at a position that corresponds to the rise-and-fall component and that is on the thin-film circuit board. When the user presses the key to the second position, a structure of the rise-and-fall component triggers the key switch to implement the input of the key signal. For an electronic device including the keyboard in this embodiment of this application, the content displayed on the electronic ink screen may match a function of the key. In other words, when the key is configured to have at least one function, the electronic ink screen also has at least one display area. One display area of the electronic ink screen may be selected, based on a current function of the key, to display content that matches the function.

For a problem in the prior art that a power supply signal cannot be stably transmitted to an electronic ink screen, in this embodiment of this application, to implement an electric connection between the electronic ink screen and the circuit board, a conductive path may be disposed on each of the keycap, the rise-and-fall component, and the bottom plate whose positions are relatively fixed. To be specific, a first electric conductor is disposed on the keycap, a second electric conductor is disposed on the rise-and-fall component, and a third electric conductor is disposed on the bottom plate. During specific disposing, the first electric conductor is electrically connected to the electronic ink screen. One end of the second electric conductor is electrically connected to the first electric conductor at a joint between the keycap and the rise-and-fall component, and the other end of the second electric conductor is electrically connected to the third electric conductor at a joint between the rise-and-fall component and the bottom plate. The third electric conductor is electrically connected to the signal line that is disposed on the circuit board and that is used to supply power to the electronic ink screen. In this way, the power supply signal provided by the signal line on the circuit board may be transmitted to the electronic ink screen through the third electric conductor, the second electric conductor, and the first electric conductor in sequence.

A manner of disposing the first electric conductor, the second electric conductor, and the third electric conductor is determined based on a specific structure form of the rise-and-fall component. The following separately describes specific disposing manners of electric conductors by using several common rise-and-fall components as examples.

Figure 3:
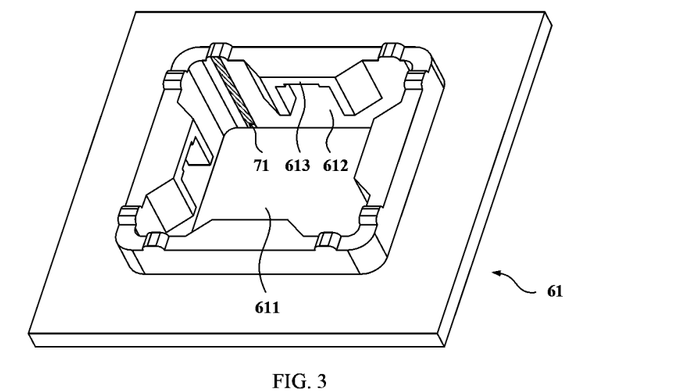
FIG. 3 is a schematic structural diagram of a bracket according to an embodiment of this application.
Figure 4:
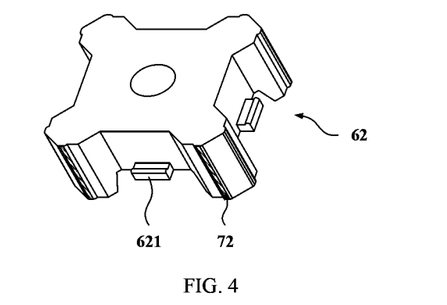
FIG. 4 is a schematic structural diagram of a support cradle according to an embodiment of this application.
Figure 5:
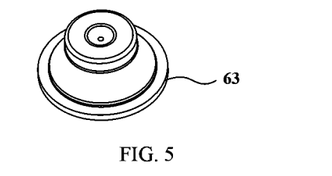
FIG. 5 is a schematic structural diagram of a first elastic part according to an embodiment of this application.
Figure 6:
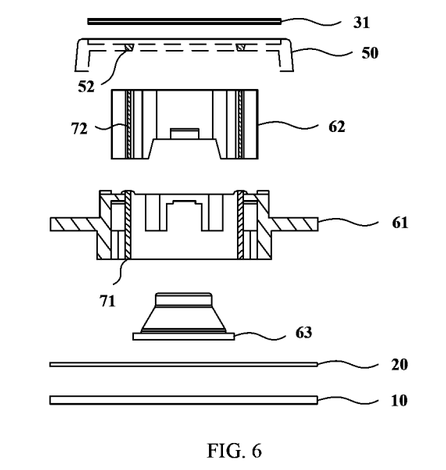
FIG. 6 is a cut-away view of a key according to an embodiment of this application.

Referring to FIG. 1 to FIG. 6, FIG. 1 to FIG. 5 illustrate specific structures of a rise-and-fall component according to an embodiment of this application. In this embodiment, the rise-and-fall component includes a bracket 61 and a support cradle 62. The bracket 61 presses against the bottom plate 10 through a first avoidance hole disposed in the circuit board, and a sliding slot 611 is disposed in a central area of the bracket 61. A direction in which the sliding slot 611 is extended is set to be the same as a direction in which the keycap 50 is moved. The support cradle 62 is slidingly assembled in the sliding slot 611, and one end that is of the support cradle 62 and that is close to the keycap 50 is connected to the keycap 50. As shown in FIG. 3, there is a guide rail 612 in an inner wall of the sliding slot 611. A direction in which the guide rail 612 is extended is also set to be the same as the direction in which the keycap 50 is extended. There is a position-limiting part 613 at an end that is of the guide rail 612 and that is away from the bottom plate 10, and there is a position-limiting step 621 at an end that is of an outer wall of the support cradle 62 and that is away from the keycap 50. When the support cradle 62 is assembled in the sliding slot 611 of the bracket 61, the position-limiting step 621 is first aligned with the guide rail 612 in the sliding slot 611, and then, the support cradle 62 is inserted into the sliding slot 611 from one end, at which the position-limiting part 613 is not disposed, of the sliding slot 611. In this case, the position-limiting step 621 cooperates with the guide rail 612 to provide a guiding effect for sliding of the support cradle 62. In addition, the position-limiting part 613 may also provide a position-limiting effect for sliding of the support cradle 62, to prevent the support cradle 62 from sliding out of the sliding slot 611. This improves structural reliability of the rise-and-fall component. When a user presses the keycap 50, the support cradle 62 slides in the sliding slot 611 of the bracket 61, to change a height of the rise-and-fall component. It should be noted that the first avoidance hole may include several independent holes arranged in an annular manner, and there are cradles respectively corresponding to the several independent holes at an end that is of the bracket and that is close to the bottom plate. The cradle of the bracket is connected to the bottom plate through a corresponding hole, so that the bracket presses against the bottom plate. In addition to the foregoing structure, the rise-and-fall component further includes a first elastic part 63. The first elastic part 63 is located at a bottom of the sliding slot 611. One end of the first elastic part 63 presses against the circuit board 20, and the other end of the first elastic part 63 presses against an end that is of the support cradle 62 and that is away from the keycap 50. The first elastic part 63 may provide elastic support force for the unpressed keycap 50. Also, elastic deformation may occur in the first elastic part 63, so that the keycap 50 can move from the first position at which the keycap 50 is not pressed to the second position at which the keycap 50 is pressed. In addition, the first elastic part 63 may be restored to provide driving force for the keycap 50 to be reset from the second position at which the keycap 50 is pressed to the first position at which the keycap 50 is not pressed. As shown in FIG. 5, the first elastic part 63 may be made of a rubber material. In this case, the first elastic part 63 may be molded through rubber injection into a circular truncated cone having a hollow structure. The first elastic part 63 having this structure can provide the elastic support force required when the keycap 50 is maintained at the first position at which the keycap 50 is not pressed, and can also meet an easiness requirement when the user is pressing a key.

Specifically, in the embodiment shown in FIG. 1 to FIG. 6, the first electric conductor is a first via 521 disposed in the keycap 50. The second electric conductor includes a first metal layer 71 that is disposed on the inner wall of the sliding slot 611 and a second metal layer 72 that is disposed on the outer wall of the support cradle 62 and that is electrically connected to the first metal layer 71. An end that is of the first metal layer 71 and that is close to the bottom plate 10 is electrically connected to the third electric conductor, and an end that is of the second metal layer 72 and that is close to the keycap 50 is electrically connected to the first via 521. In this way, a metal layer is disposed on a surface of the support cradle 62 and on a surface of the sliding slot 611 that move in an opposite direction. Even if the support cradle 62 slides in the sliding slot 611 of the bracket 61, it may also be ensured that the first metal layer 71 can be reliably connected to the second metal layer 72. In the solution of this embodiment, the third electric conductor may also be a metal layer disposed on a surface of the bottom plate 10 or a transmission line in another form, provided that the first metal layer 71 can be electrically connected to the signal line 21 on the circuit board.

Referring to FIG. 7 to FIG. 10, FIG. 7 to FIG. 10 show specific structures of the rise-and-fall component 60 according to another embodiment of this application. In this embodiment, the rise-and-fall component 60 includes a first frame 64 and a second frame 65 that are articulated. During specific disposing, a first opening 641 may be disposed in a central area of the first frame 64, so that the second frame 65 may be articulated to the first opening 641. The first frame 64 includes a first end 642 and a second end 643 that are opposite to each other. The first end 642 of the first frame is articulated to a bottom plate 10 through a second avoidance hole 22 disposed in a circuit board, and the second end 643 is slidingly connected to a keycap 50. The second frame 65 includes a first end 652 and a second end 653 that are opposite to each other. The first end 652 of the second frame is articulated to the keycap 50, and the second end 653 is slidingly connected to the bottom plate 10 through a third avoidance hole 23 disposed in the circuit board. In addition, the first end 642 of the first frame and the first end 652 of the second frame are located on a same side of an articulated joint between the first frame 64 and the second frame 65. When a user presses the keycap 50, the first frame 64 may rotate relative to the keycap 50, and the second frame 65 may rotate relative to the bottom plate 10. At the same time, the first frame 64 may rotate relative to the second frame 65. This may change a height of the rise-and-fall component 60. In addition to the foregoing structure, the rise-and-fall component further includes a second elastic part, and the second frame 65 has a second hole 651 through which the second elastic part may pass. In this way, the second elastic part may pass through the second hole 651, so that one end of the second elastic part presses against the circuit board 20, and the other end of the second elastic part presses against the keycap 50. Similarly, the second elastic part may provide elastic support force for the unpressed keycap 50. Also, elastic deformation may occur in the second elastic part, so that the keycap 50 can move from a first position at which the keycap 50 is not pressed to a second position at which the keycap 50 is pressed. In addition, the second elastic part may be restored to provide driving force for the keycap 50 to be reset from the second position at which the keycap 50 is pressed to the first position at which the keycap 50 is not pressed. Similar to the first elastic part, the second elastic part may also be made of a rubber material. In this case, the second elastic part may be molded through rubber injection into a circular truncated cone having a hollow structure. The first elastic part having this structure can provide the elastic support force required when the keycap is maintained at the first position at which the keycap is not pressed, and can also meet an easiness requirement when the user is pressing a key.

Figure 7:
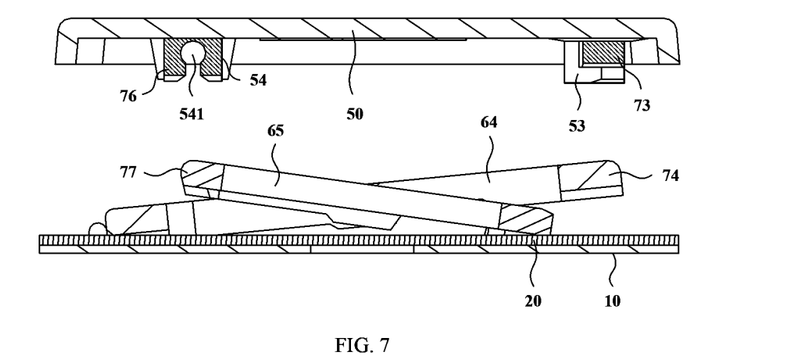
FIG. 7 is a schematic structural diagram of another key according to an embodiment of this application.
Figure 8:
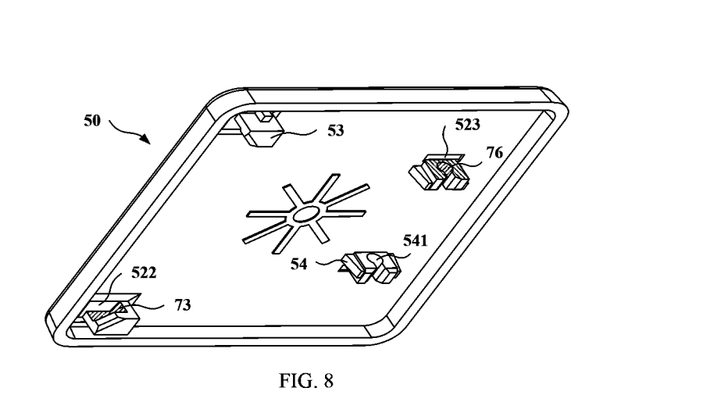
FIG. 8 is a schematic structural diagram of another keycap according to an embodiment of this application.
Figure 9:
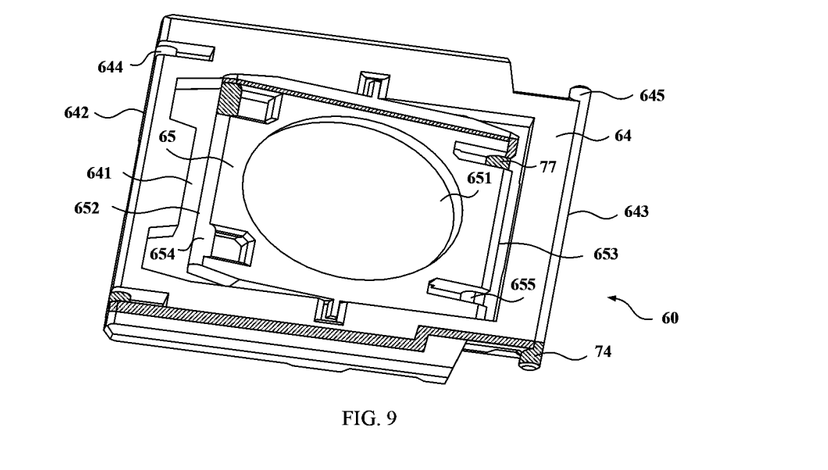
FIG. 9 is a schematic structural diagram of a rise-and-fall component according to an embodiment of this application.
Figure 10:
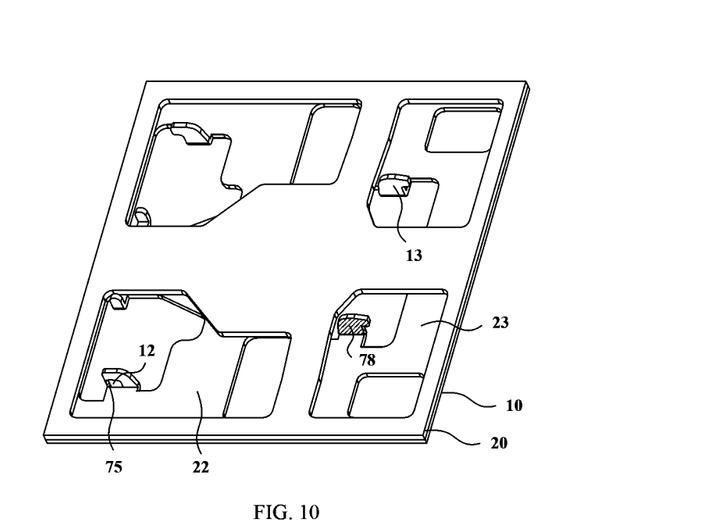
FIG. 10 is a schematic structural diagram of a bottom plate according to an embodiment of this application.

A sliding connection or a rotating connection between the first frame 64, the second frame 65, the keycap 50, and the bottom plate 10 may be specifically implemented in the manners shown in FIG. 7 to FIG. 9. For the first frame 64, the first end 642 of the first frame has a first articulated shaft 644, and the bottom plate 10 has a first articulated hole 12 that is articulated to the first articulated shaft 644. The second end 643 of the first frame has a first slider 645. A first hook 53 whose opening direction is opposite to a side of the articulated joint between the first frame 64 and the second frame 65 is disposed on a side that is of the keycap 50 and that faces the circuit board 20. The first slider 645 is slidingly assembled in the first hook 53. For the second frame 65, the first end 652 of the second frame has a second articulated shaft 654, and a convex lug 54 provided with a second articulated hole 541 is disposed on the side that is of the keycap 50 and that faces the circuit board 20. The second articulated shaft 654 is articulated to the second articulated hole 541, and the second end 653 of the second frame has a second slider 655. A second hook 13 whose opening direction is opposite to the side of the articulated joint between the first frame 64 and the second frame 65 is disposed on the bottom plate 10, and the second slider 655 is slidingly assembled in the second hook 13.

In the embodiment shown in FIG. 7 to FIG. 10, a first electric conductor includes a second via 522 disposed in the keycap 50 and a third metal layer 73 disposed on a surface of the first hook 53. The second via 522 is connected to an electronic ink screen, and the third metal layer 73 is electrically connected to the first via 522. A second electric conductor includes a fourth conducting layer 74, and the fourth conducting layer 74 covers an outer wall of the first slider 645, a surface of the first frame 64, and an outer wall of the first articulated shaft 644. A third electric conductor includes a fifth metal layer 75 disposed on an inner wall of the first articulated hole 12. In this way, a metal layer is disposed on a surface of the first frame 64 and on a surface of the bottom plate 10 that move in an opposite direction, and a metal layer is disposed on a surface of the first frame 64 and on a surface of the keycap 50 that move in an opposite direction. Even if the first frame 64 rotates relative to the bottom plate 10 or moves relative to the keycap 50, it may also be ensured that the third metal layer 73 is reliably electrically connected to the fourth metal layer 74, and the fourth metal layer 74 is reliably electrically connected to the fifth metal layer 75. It should be noted that, the third electric conductor includes the fifth metal layer 75 disposed on the inner wall of the first articulated hole 12, and may further include a transmission line disposed on a surface of the bottom plate 10. The fifth metal layer 75 may be electrically connected to a signal line on the circuit board 20 by using the transmission line. In this way, a power supply signal provided by the signal line is transmitted to the electronic ink screen through the transmission line, the fifth metal layer 75, the fourth metal layer 74, the third metal layer 73, and the second via 522 in sequence. This can effectively improve signal transmission reliability. In addition, in this embodiment, the fourth metal layer does not cover an entire surface of the first frame 64. For example, a partial coverage manner may be used as shown in FIG. 9.

In the foregoing embodiment, a conducting signal is transmitted by disposing the second electric conductor in the first frame 64. In another embodiment of this application, a conduction effect may alternatively be implemented by disposing the second electric conductor in the second frame 65. During specific implementation, the first electric conductor includes a third via 523 disposed in the keycap 50 and a sixth metal layer 76 electrically connected to the third via 523. The sixth metal layer 76 covers an inner wall of the second articulated hole 541 and a surface of the convex lug 54. The third via 523 is connected to the electronic ink screen. The second electric conductor includes a seventh metal layer 77, and the seventh metal layer 77 covers an outer wall of the second articulated shaft 654, a surface of the second frame 65, and an outer wall of the second slider 655. The third electric conductor includes an eighth metal layer 78 disposed on a surface of the second hook 13. In this way, a metal layer is disposed on a surface of the second frame 65 and on a surface of the bottom plate 10 that move in an opposite direction, and a metal layer is disposed on a surface of the second frame 65 and on a surface of the keycap 50 that move in an opposite direction. Even if the second frame 65 moves relative to the bottom plate 10 or rotates relative to the keycap 50, it may also be ensured that the sixth metal layer 76 is reliably electrically connected to the seventh metal layer 77, and the seventh metal layer 77 is reliably electrically connected to the eighth metal layer 78. Similarly, the third electric conductor includes the eighth metal layer 78 disposed on the surface of the second hook 13, and may further include a transmission line disposed on the surface of the bottom plate 10. The eighth metal layer 78 may be electrically connected to a signal line on the circuit board by using the transmission line. In this way, a power supply signal provided by the signal line is transmitted to the electronic ink screen through the transmission line, the eighth metal layer 78, the seventh metal layer 77, the sixth metal layer 76, and the third via 523 in sequence. This can effectively improve signal transmission reliability. In this embodiment, the seventh metal layer does not cover an entire surface of the second frame 65. For example, a partial coverage manner may be used as shown in FIG. 9.

Figure 11:
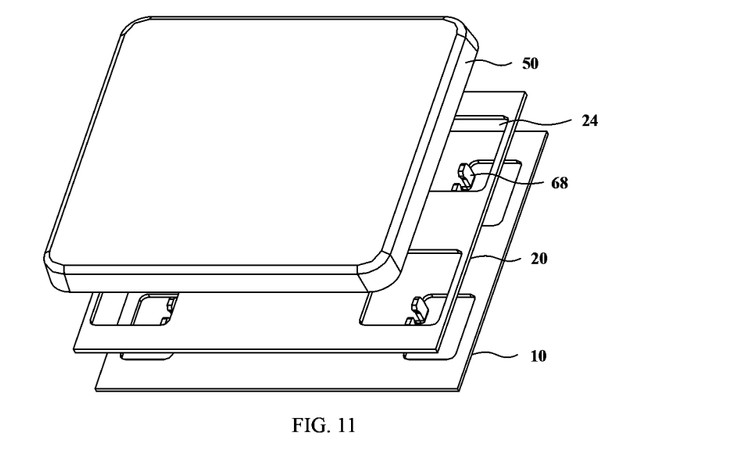
FIG. 11 is a schematic structural diagram of another key according to an embodiment of this application.
Figure 12:
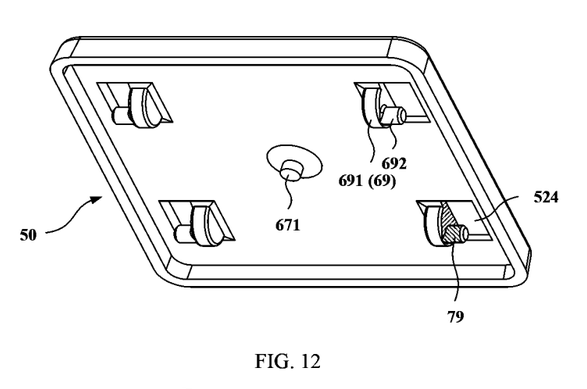
FIG. 12 is a schematic structural diagram of another keycap according to an embodiment of this application.
Figure 13:
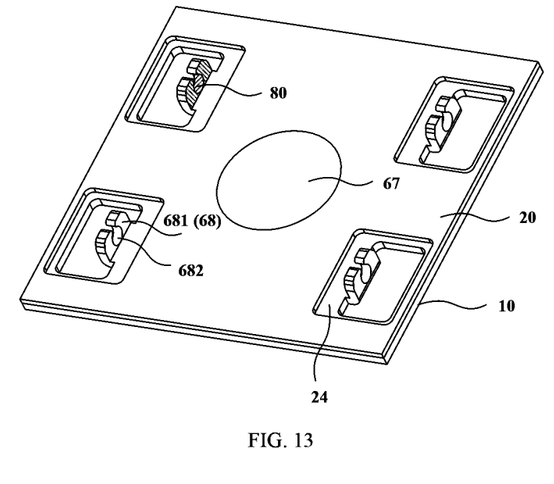
FIG. 13 is a schematic structural diagram of another bottom plate according to an embodiment of this application.

Referring to FIG. 11 to FIG. 13, FIG. 11 to FIG. 13 show specific structures of a rise-and-fall component according to another embodiment of this application. In this embodiment, the rise-and-fall component includes a first connection part 68 disposed on a bottom plate 10 and a second connection part 69 disposed on a keycap 50. The first connection part 68 includes a first vertical plate 681 disposed facing the keycap 50. A strip-shaped hole 682 is disposed in the first vertical plate 681, and a direction in which the strip-shaped hole 682 is extended is set to be the same as a direction in which the keycap 50 is moved. The second connection part 69 includes a second vertical plate 691 disposed facing the bottom plate. The second vertical plate 691 has a cylinder 692, and the cylinder 692 is slidingly assembled in the strip-shaped hole 682. When a user presses the keycap 50, the cylinder 692 of the second connection part 69 may slide in the strip-shaped hole 682 of the first connection part 68, to change a height of the rise-and-fall component. In addition to the foregoing structure, the rise-and-fall component further includes a metal spring 67 disposed on a circuit board 20 and a back-up cradle 671 that is disposed under the keycap 50 and that is located opposite to the metal spring 67. One end that is of the back-up cradle 671 and that is away from the keycap 50 presses against the metal spring 67, and the metal spring 67 may provide elastic support force for the unpressed keycap 50. When the user presses the keycap 50, a center of the metal spring 67 is concave, so that the keycap 50 may move from a first position to a second position. When pressing force from the user is removed, the center of the metal spring 67 is restored to provide driving force for the keycap 50 to be reset from the second position to the first position. A specific shape of the metal spring 67 includes but is not limited to a shape such as a circle, a cross, a triangle, or an ellipse. It should be understood that, to ensure that the first connection part 68 is reliably connected to the second connection part 69, a fourth avoidance hole 24 should be disposed at a position, on the circuit board 20, at which the first connection part 68 is correspondingly disposed.

In the embodiment shown in FIG. 11 to FIG. 13, a first electric conductor is a fourth via 524 disposed in the keycap. A second electric conductor includes a ninth metal layer 79 and a tenth metal layer 80 that is electrically connected to a third electric conductor. The ninth metal layer 79 covers an outer wall of the cylinder 692 and a surface of a second vertical wall 691. The tenth metal layer 80 covers an inner wall of the strip-shaped hole 681 and a surface of the first vertical plate 681. In this way, a metal layer is disposed on a surface of the strip-shaped hole 681 of the first connection part 68 and on a surface of the cylinder 692 of the second connection part 69 that move in an opposite direction. Even if the cylinder 692 slides in the strip-shaped hole 681, it may also be ensured that the ninth metal layer 79 is reliably connected to the tenth metal layer 80. In this case, the third electric conductor may be a transmission line disposed on a surface of the bottom plate 10, and the tenth metal layer 80 may be electrically connected to a signal line on the circuit board 20 by using the transmission line. In this way, a power supply signal provided by the signal line is transmitted to an electronic ink screen through the transmission line, the tenth metal layer 80, the ninth metal layer 79, and the fourth via 524 in sequence. This can effectively improve signal transmission reliability.

The metal layers in the foregoing embodiments of this application may be specifically disposed and formed on surfaces of structures by using an etching process. The foregoing embodiments list specific arrangement forms of the first electric conductor, the second electric conductor, and the third electric conductor when the rise-and-fall component of several different structures is used. It should be noted that the rise-and-fall component in the embodiments of this application is not limited to the foregoing several structures. For a rise-and-fall component that uses another form and that connects the keycap to the bottom plate to provide driving force for reciprocating motion of the keycap, electric conductors may also be disposed based on a specific structure of the rise-and-fall component, to reliably transmit, to the electronic ink screen through the electric conductors in sequence, the power supply signal provided by the signal line on the circuit board.

Figure 14:
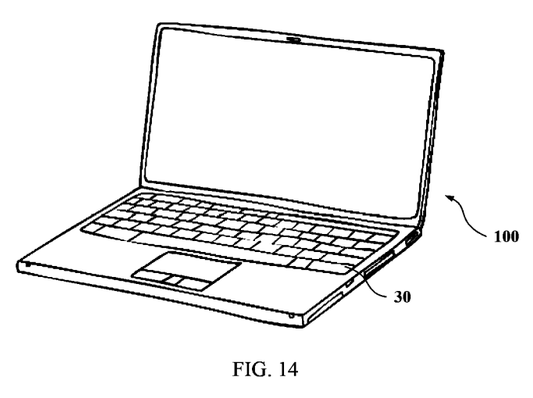
FIG. 14 is a schematic structural diagram of an electronic device according to an embodiment of this application.

Referring to FIG. 14, this application further provides an electronic device 100. The electronic device 100 includes any one of the foregoing keyboards. A key 30 on the keyboard of the electronic device has a relatively good light emitting effect.

In this embodiment of this application, an electronic ink screen on the key may be used in cooperation with a software program and the like installed on the electronic device. For example, when education software is installed on the electronic device, a power supply signal is provided to the electronic ink screen on the key through a signal line on a circuit board, so that the electronic ink screen displays a cartoon pattern to interact with a user. For another example, when game software is installed on the electronic device, a screen-on and screen-off sequence of the electronic ink screen on a related key may be set based on a game progress. After a game level is completed, a next game level continues. Certainly, the electronic ink screen on the key may also be used for prompt, for example, a battery power warning of the electronic device, or in a scenario, a prompt function needs to be performed.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A keyboard, comprising:
a bottom plate;
a circuit board disposed on the bottom plate; and
a plurality of keys disposed on a side of the circuit board, wherein the side of the circuit board is away from the bottom plate;
wherein each key comprises a keycap, a rise-and-fall component connecting the keycap to the bottom plate, and an electronic ink screen fastened on a side of the keycap, the side of the keycap is away from the rise-and-fall component;
wherein a first electric conductor connected to the electronic ink screen is disposed on the keycap, a second electric conductor is disposed on the rise-and-fall component, a third electric conductor is disposed on the bottom plate, a signal line used to supply power to the electronic ink screen is disposed on the circuit board, one end of the second electric conductor is electrically connected to the first electric conductor at a joint between the keycap and the rise-and-fall component, another end of the second electric conductor is electrically connected to the third electric conductor at a joint between the rise-and-fall component and the bottom plate, and the third electric conductor is electrically connected to the signal line.

2. The keyboard according to claim 1, wherein the electronic ink screen comprises at least one display area, the first electric conductor disposed on the keycap is one-to-one connected to each display area, the second electric conductor disposed on the rise-and-fall component is in a one-to-one electrical connection to the first electric conductor, the third electric conductor disposed on the bottom plate is in a one-to-one electric electrical connection to the second electric conductor, the signal line disposed on the circuit board is used to supply power to each display area, and the signal line is electrically connected to a corresponding third electric conductor.

3. The keyboard according to claim 2, wherein
the rise-and-fall component comprises: a bracket that passes through a first avoidance hole disposed in the circuit board and that presses against the bottom plate, and a support cradle that is fastened to the keycap, wherein a sliding slot whose opening faces the keycap is disposed in the support cradle, the support cradle is slidingly assembled in the sliding slot, a first elastic part is disposed in the sliding slot, one end of the first elastic part presses against the circuit board, and another end of the first elastic part presses against the support cradle,
the first electric conductor is a first via disposed in the keycap, the second electric conductor comprises a first metal layer disposed on an inner wall of the sliding slot and a second metal layer disposed on an outer wall of the support cradle and electrically connected to the first metal layer, an end of the first metal layer that is closer to the bottom plate is electrically connected to the third electric conductor, and an end of the second metal layer that is closer to the keycap is electrically connected to the first via.

4. The keyboard according to claim 3, wherein
a guide rail is disposed in the inner wall of the sliding slot in a moving direction of the keycap,
a position-limiting part at an end of the guide rail that is away from the bottom plate,
a position-limiting step at an end of the outer wall of the support cradle that is away from the keycap, and
the position-limiting step is slidingly assembled in the guide rail and is located in the position-limiting part.

5. The keyboard according to claim 3, wherein
the rise-and-fall component further comprises a first frame and a second frame that are disposed in a cross manner, and a second elastic part,
a first end of the first frame is articulated to the bottom plate through a second avoidance hole disposed in the circuit board, a second end is slidingly connected to the keycap, a first end of the second frame is articulated to the keycap, and a second end is slidingly connected to the bottom plate through a third avoidance hole disposed in the circuit board, and
one end of the second elastic part presses against the circuit board, and another end of the second elastic part presses against the keycap.

6. The keyboard according to claim 5, wherein the first end of the first frame has a first articulated shaft, the bottom plate has a first articulated hole articulated to the first articulated shaft, the second end of the first frame has a first slider, a first hook whose opening direction is opposite to a side of an articulated joint between the first frame and the second frame is disposed on a side of the keycap that faces the circuit board, and the first slider is slidingly assembled in the first hook;
the first end of the second frame has a second articulated shaft, a convex lug provided with a second articulated hole is disposed on the side of the keycap that faces the circuit board, the second articulated shaft is articulated to the second articulated hole, the second end of the second frame has a second slider, a second hook whose opening direction is opposite to the side of the articulated joint between the first frame and the second frame is disposed on the bottom plate, and the second slider is slidingly assembled in the second hook;
the first electric conductor comprises a second via disposed in the keycap, and a third metal layer disposed on a surface of the first hook and electrically connected to the second via, the second electric conductor comprises a fourth conducting layer covering an outer wall of the first slider, a surface of the first frame, and an outer wall of the first articulated shaft, the third electric conductor comprises a fifth metal layer disposed on an inner wall of the first articulated hole, the third metal layer is electrically connected to the fourth metal layer, and the fourth metal layer is electrically connected to the fifth metal layer; or the first electric conductor comprises a third via disposed in the keycap and a sixth metal layer electrically connected to the third via, the sixth metal layer covers an inner wall of the second articulated hole and a surface of the convex lug, the second electric conductor comprises a seventh metal layer covering an outer wall of the second articulated shaft, a surface of the second frame, and an outer wall of the second slider, the third electric conductor comprises an eighth metal layer disposed on a surface of the second hook, the sixth metal layer is electrically connected to the seventh metal layer that is electrically connected to the eighth metal layer.

7. The keyboard according to claim 2, wherein the rise-and-fall component comprises a metal spring disposed on the circuit board, a back-up cradle disposed on the keycap is located opposite to the metal spring, a first connection part disposed on the bottom plate, and a second connection part disposed on the keycap, wherein an end of the back-up cradle away from the keycap presses against the metal spring, the first connection part comprises a first vertical plate that passes through a fourth avoidance hole disposed in the circuit board and that is disposed facing the keycap, a strip-shaped hole is disposed in the first vertical plate in a moving direction of the keycap, the second connection part comprises a second vertical plate disposed facing the bottom plate, and a cylinder slidingly assembled in the strip-shaped hole is disposed on the second vertical plate; and the first electric conductor is a fourth via disposed in the keycap, the second electric conductor comprises a ninth metal layer and a tenth metal layer, the ninth metal layer covers an outer wall of the cylinder and a surface of a second vertical wall, the tenth metal layer covers an inner wall of the strip-shaped hole and a surface of the first vertical plate, the ninth metal layer is electrically connected to the fourth via, and the tenth metal layer is electrically connected to the third electric conductor.

8. The keyboard according to claim 2, wherein the at least one display area comprises four display areas.

9. The keyboard according to claim 1, wherein an accommodating groove is disposed on a surface of a side of the keycap that is away from the rise-and-fall component, and the electronic ink screen is located in the accommodating groove.

10. The keyboard according to claim 9, wherein the key further comprises a transparent cover configured to seal the electronic ink screen in the accommodating groove, and the transparent cover is detachably connected to the keycap.

11. An electronic device, comprising:
a keyboard comprising: a bottom plate, a circuit board disposed on the bottom plate, and a plurality of keys disposed on a side of the circuit board, wherein the side of the circuit board is away from the bottom plate,
wherein each key comprises a keycap, a rise-and-fall component connecting the keycap to the bottom plate, and an electronic ink screen fastened on a side of the keycap, the side of the keycap is away from the rise-and-fall component,
wherein a first electric conductor connected to the electronic ink screen is disposed on the keycap, a second electric conductor is disposed on the rise-and-fall component, a third electric conductor is disposed on the bottom plate, a signal line used to supply power to the electronic ink screen is disposed on the circuit board, one end of the second electric conductor is electrically connected to the first electric conductor at a joint between the keycap and the rise-and-fall component, another end of the second electric conductor is electrically connected to the third electric conductor at a joint between the rise-and-fall component and the bottom plate, and the third electric conductor is electrically connected to the signal line.

12. The electronic device according to claim 11, wherein the electronic ink screen comprises at least one display area, the first electric conductor disposed on the keycap is one-to-one connected to each display area, the second electric conductor disposed on the rise-and-fall component is in a one-to-one electrical connection to the first electric conductor, the third electric conductor disposed on the bottom plate is in a one-to-one electrical connection to the second electric conductor, the signal line disposed on the circuit board is used to supply power to each display area, and the signal line is electrically connected to a corresponding third electric conductor.

13. The electronic device according to claim 12, wherein the rise-and-fall component comprises: a bracket that passes through a first avoidance hole disposed in the circuit board and that presses against the bottom plate, and a support cradle that is fastened to the keycap, wherein a sliding slot whose opening faces the keycap is disposed in the support cradle, the support cradle is slidingly assembled in the sliding slot, a first elastic part is disposed in the sliding slot, one end of the first elastic part presses against the circuit board, and another end of the first elastic part presses against the support cradle, the first electric conductor is a first via disposed in the keycap, the second electric conductor comprises a first metal layer disposed on an inner wall of the sliding slot and a second metal layer disposed on an outer wall of the support cradle and electrically connected to the first metal layer, an end of the first metal layer that is closer to the bottom plate is electrically connected to the third electric conductor, and an end of the second metal layer that is closer to the keycap is electrically connected to the first via.

14. The electronic device according to claim 13, wherein a guide rail is disposed in the inner wall of the sliding slot in a moving direction of the keycap,
a position-limiting part at an end of the guide rail that is away from the bottom plate,
a position-limiting step at an end of the outer wall of the support cradle that is away from the keycap, and
the position-limiting step is slidingly assembled in the guide rail and is located in the position-limiting part.

15. The electronic device according to claim 13, wherein the rise-and-fall component further comprises a first frame and a second frame that are disposed in a cross manner, and a second elastic part,
a first end of the first frame is articulated to the bottom plate through a second avoidance hole disposed in the circuit board, a second end is slidingly connected to the keycap, a first end of the second frame is articulated to the keycap, and a second end is slidingly connected to the bottom plate through a third avoidance hole disposed in the circuit board, and
one end of the second elastic part presses against the circuit board, and another end of the second elastic part presses against the keycap.

16. The electronic device according to claim 15, wherein the first end of the first frame has a first articulated shaft, the bottom plate has a first articulated hole articulated to the first articulated shaft, the second end of the first frame has a first slider, a first hook whose opening direction is opposite to a side of an articulated joint between the first frame and the second frame is disposed on a side of the keycap that faces the circuit board, and the first slider is slidingly assembled in the first hook;

the first end of the second frame has a second articulated shaft, a convex lug provided with a second articulated hole is disposed on the side of the keycap that faces the circuit board, the second articulated shaft is articulated to the second articulated hole, the second end of the second frame has a second slider, a second hook whose opening direction is opposite to the side of the articulated joint between the first frame and the second frame is disposed on the bottom plate, and the second slider is slidingly assembled in the second hook;

the first electric conductor comprises a second via disposed in the keycap, and a third metal layer disposed on a surface of the first hook and electrically connected to the second via, the second electric conductor comprises a fourth conducting layer covering an outer wall of the first slider, a surface of the first frame, and an outer wall of the first articulated shaft, the third electric conductor comprises a fifth metal layer disposed on an inner wall of the first articulated hole, the third metal layer is electrically connected to the fourth metal layer, and the fourth metal layer is electrically connected to the fifth metal layer; or     the first electric conductor comprises a third via disposed in the keycap and a sixth metal layer electrically connected to the third via, the sixth metal layer covers an inner wall of the second articulated hole and a surface of the convex lug, the second electric conductor comprises a seventh metal layer covering an outer wall of the second articulated shaft, a surface of the second frame, and an outer wall of the second slider, the third electric conductor comprises an eighth metal layer disposed on a surface of the second hook, the sixth metal layer is electrically connected to the seventh metal layer that is electrically connected to the eighth metal layer.

17. The electronic device according to claim 12, wherein the rise-and-fall component comprises a metal spring disposed on the circuit board, a back-up cradle disposed on the keycap is located opposite to the metal spring, a first connection part disposed on the bottom plate, and a second connection part disposed on the keycap, wherein an end of the back-up cradle away from the keycap presses against the metal spring, the first connection part comprises a first vertical plate that passes through a fourth avoidance hole disposed in the circuit board and that is disposed facing the keycap, a strip-shaped hole is disposed in the first vertical plate in a moving direction of the keycap, the second connection part comprises a second vertical plate disposed facing the bottom plate, and a cylinder slidingly assembled in the strip-shaped hole is disposed on the second vertical plate; and     the first electric conductor is a fourth via disposed in the keycap, the second electric conductor comprises a ninth metal layer and a tenth metal layer, the ninth metal layer covers an outer wall of the cylinder and a surface of a second vertical wall, the tenth metal layer covers an inner wall of the strip-shaped hole and a surface of the first vertical plate, the ninth metal layer is electrically connected to the fourth via, and the tenth metal layer is electrically connected to the third electric conductor.

18. The electronic device according to claim 12, wherein the at least one display area comprises four display areas.

19. The electronic device according to claim 11, wherein an accommodating groove is disposed on a surface of a side of the keycap that is away from the rise-and-fall component, and the electronic ink screen is located in the accommodating groove.

20. The electronic device according to claim 19, wherein the key further comprises a transparent cover configured to seal the electronic ink screen in the accommodating groove, and the transparent cover is detachably connected to the keycap.

\* \* \* \* \*